Figure 1A:
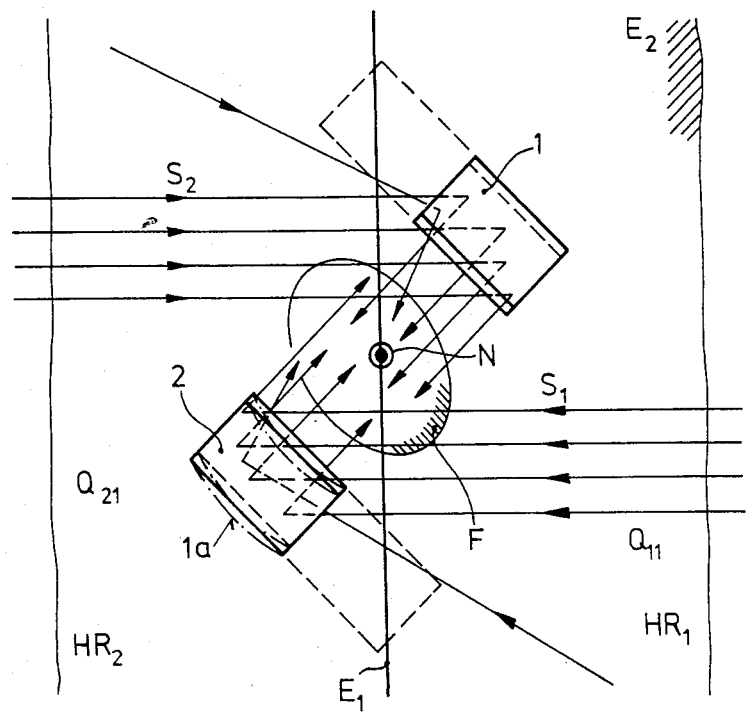

United States Patent [19]

Züblin

[11] Patent Number: 4,644,147

[45] Date of Patent: Feb. 17, 1987

[54] METHOD FOR DEFLECTION OF OPTICAL RAYS AND AN OPTICAL ARRANGEMENT THEREFOR

[76] Inventor: Marcel Züblin, Tachlisbrunnerstr. 28, 8400 Winterthur, Switzerland

[21] Appl. No.: 883,863

[22] Filed: Jul. 11, 1986

Related U.S. Application Data

[63] Continuation of Ser. No. 568,485, Jan. 5, 1984, abandoned.

[30] Foreign Application Priority Data

Jan. 5, 1983 [CH] Switzerland ............................... 43/83
Oct. 21, 1983 [CH] Switzerland ........................... 5727/83

[51] Int. Cl.$^4$ .......................... G01D 21/04; G01J 1/04
[52] U.S. Cl. ..................................... 250/221; 350/612; 250/342; 250/353; 340/567
[58] Field of Search ...................... 350/441, 612, 613; 250/221, 203 R, 342, 353; 340/567

[56] References Cited

U.S. PATENT DOCUMENTS

| 3,958,118 | 5/1976 | Schwarz. | |
|---|---|---|---|
| 3,988,726 | 10/1976 | Reiss et al. | 250/338 |
| 4,238,675 | 12/1980 | Turlej et al. | 250/342 |
| 4,375,034 | 2/1983 | Guscott | 250/342 |
| 4,442,359 | 5/1984 | Lederer | 250/342 |

FOREIGN PATENT DOCUMENTS

| 2537380 | 9/1976 | Fed. Rep. of Germany. |
|---|---|---|
| 2645040 | 11/1977 | Fed. Rep. of Germany. |
| 2653111 | 12/1977 | Fed. Rep. of Germany. |
| 2901196 | 7/1980 | Fed. Rep. of Germany. |
| 3132207 | 3/1983 | Fed. Rep. of Germany. |

*Primary Examiner*—John K. Corbin
*Assistant Examiner*—P. M. Dzierzynski
*Attorney, Agent, or Firm*—Lerner, David, Littenberg Krumholz & Mentlik

[57] ABSTRACT

A method and apparatus is shown for receiving optical rays with a maximum angle of sensitivity so that a single detector can monitor a wide, spherical angle. This method is used with infrared detectors which would be mounted on a wall to switch the lamps of a room on and off as soon as a person enters the room.

29 Claims, 14 Drawing Figures

METHOD FOR DEFLECTION OF OPTICAL RAYS AND AN OPTICAL ARRANGEMENT THEREFOR

This is a continuation of application Ser. No. 568,485, filed Jan. 5, 1984, now abandoned.

The present invention is directed to a method for the deflection of optical rays received from two semi-infinite spaces separated by a first plane, onto an area of a second plane, which plane subdivides said semi-infinite spaces in quadrants, said area laying around the foot of a normal on said second plane and in the first plane.

It is known that opto-electric transducers as an ELTEC Instr. Inc. pyroelectric detector model 408, have a relatively narrow angled characteristic of receiver sensitivity. The lobe like characteristic around the central axis of such an element shows a maximum of sensitivity in this central axis, which drops with rising angle with respect to that axis first relatively slowly but considerably when angles become greater than approximately 45°. For the use of such detectors as of such pyroelectric-or infrared-detectors e.g. for the control of lamps in security equipments or for lightening rooms there is a need to detect infrared rays emitted from infrared sources, as from human bodies at wide angles, so that already provision of a single detector would allow to monitor a great deal of spherical angle. If, for instance, such an infrared-detector would be mounted on a wall with the target to switch the lamps of a room on as soon as somebody enters that room and without said person having first to look for a manual switch in the darkness, it becomes clear that it would then be advantageous if such a detector would allow for greater distance of the radiation or the rays received with respect to its central axis, then arranged in right-angle relation with respect to a wall, from angles as large as possible, that is rays which are received from directions up to 90° with respect to said axis or even more. This need is in contradiction with the receiving sensibility characteristic described above of such a detector, which as was mentioned, is relatively narrow-angled. Besides the use of such detectors as switching element there is also a need to use them e.g. in rooms to have the lights of the room switched on as long as a person remains in the room. This too makes it necessary to great-distance-monitor the optical rays of a source at wide angles, to have a partition of the room as big as possible surveyed with a single detector.

Considering these needs and features of known detectors, methods have been proposed which make use of hollow reflectors and multiple reflection of the received rays to be monitored, with the object to deflect these rays finally into that area of the receiver lobe of the detector which shows high grade sensitivity. On one hand, multiple reflection has the disadvantage of relatively high losses of radiation energy of the rays to be detected, on the other hand the arrangement and manufacturing of hollow reflectors together with the realisation of multiple reflection is expensive. Additionally by these known methods rays which are received with angles up to 90° with respect to the central axis of maximum sensitivity of the receiving lobe, may not be deflected to such an amount that they enter the area of high sensitivity of the lobe with narrow angles. Especially the rays received under wide angles should be monitored with highest possible sensitivity and without loss because the sensibility with respect to such rays defines the maximum monitoring distance of such a detector when for instance, such a detector is mounted on top of a room.

An object of the present invention is to provide a method of the kind mentioned above with which rays received at very wide angles with respect to a central axis may be deflected into the range of angle according to high detector sensitivity, that is to smallest possible angles with respect to the central axis of its lobe and without the disadvantages of the state of the art techniques mentioned above. This is realized with a method as mentioned above which inventively comprises the steps of reflecting rays received from one of the semi-infinite spaces at least partly in the other of the semi-infinite spaces by means of single reflection and vice versa, so that the range of angle of the rays after said reflection and with respect to the normal is substantially smaller than the range of angle of the received rays before reflection with respect to the normal.

The invention thus departs from the consideration that it is in fact possible to reflect rays with a reflector which are received under small angles with respect to a plane or even parallel thereto, back towards this plane with small angles with respect to a normal of the mentioned plane. This idea is applied on the rays received from each of the semi-infinite spaces mentioned, whereby the rays from the two semi-infinite spaces are practically cross-wise reflected towards an area of the plane laying between a plane cutting the complete space into the two semi-infinite spaces. Although such a method may on one hand be used also for monitoring of acitve radiation-barriers with narrow beams emitted already from the radiation source as emittors, in that then a plurality of such beams received under great angle with respect to a detector central axis may be monitored with a single detector and which feature leads to considerable reduction in costs for radiation barrier arrangements, the inventive method proposes on the other hand, i.e. when rays are diffusely received, to focus in each of said infinite spaces the rays before occurence of the single reflection, whereby focusing is realized with at least one optical major axis in each of the semi-infinite spaces, the major optical axis not crossing the normal.

To realize a sensitivity distribution as flat as possible with respect to the range of angle of the rays to be monitored, the received rays from each of the semi-infinite spaces are focused with several optical major axes in each of the semi-infinite spaces the single reflections being performed with focus-beam specific reflection by means of reflector elements. By cooperatively assigning the position of the reflector elements with respect to the optical major axes of focusing in a way that these major axes which enclose with respect to the normal great angles are directed on reflector elements the normal of which enclosing with said normal of the second plane smaller angles, those rays which are received under flatest angles are deflected to smallest angles with respect to the normal towards area so that the high sensibility mentioned above is reached especially for angles at the border of the semi-infinite space above the second plane, which leads to the possibility of exploiting at those angles practically the detection distance which accords to the maximum of sensibility of the detector-lobe.

It has been recognized that a sufficient distribution of sensitivity is reached within the entire semi-infinite space above the second plane when the rays are so focused that the optical major axes of focusing have projections on the second plane which are at least nearly parallel. This leads to a relatively simple and unexpensive construction of the lens/reflector arrangement.

The central area of the detector sensitivity lobe which shows per se a high sensitivity is additionally to realisation of a high sensitivity with respect to rays which are received under flat angles exploited by focusing and directing those rays on said area without reflection which rays are received with smaller angles with respect to the normal. A further simplification of the optical conditions is reached by arranging the optical major axes in each of the semi-infinite spaces so that they lay in each of the semi-infinite spaces at least nearly in a respective third plane which third plane is right-angled with respect to the second plane and whereby the two third planes in both said semi-infinite spaces are preferrably parallel to each other and preferrably symmetrically arranged with respect to the normal. It is a further object of the method proposed that it may also be used for emitting rays whereby then just the course of rays is inverted.

The optical arrangement according to the invention for the deflection of optical rays received from two semi-infinite spaces separeted by a first plane onto an area of a second plane which plane subdivides said semi-infinite spaces in quadrants, whereby the area lays around the foot of a normal on said second plane, said normal itself laying in the first plane, comprises at least two reflectors which are at least partly inclined with respect to the normal and which are positioned on two sides of the normal preferrably axial-symmetrically thereto.

The construction becomes very inexpensive and simple if the two reflectors are plane. This first embodiment is especially suited to monitor rays which are received from specific spacial directions.

Symmetrical optical conditions with respect to both semi-infinite spaces are realized when the two reflectors intersect the second plane in at least nearly parallel straight lines. If especially two spacial directions are to be monitored and the received rays are not received in already narrow beamed conditions but diffusely, two reflectors are provided and a focusing lens is cooperatively assigned to each of the reflectors. The lenses are then so arranged that their optical major axis and the normal stand in warped or rectangular relation without intersection. The arrangement of the optical axes and the normal will be chosen rectangularly or even with angles greater than 90° if the spacial directions to be monitored enclose with respect to the normal angles of 90° or even more. As the rays which are received from one semi-infinite space will before being reflected first pass the reflector which is not provided for their reflection but for the reflection of the rays received from the other semi-infinite space, it is possible that the reflectors provided unwantedly intersect with the rays which are not cooperatively assigned thereto or intersect with the beams of the lenses which are not cooperatively assigned thereto. To prevent this the intersecting area of the reflector elements projecting into the beams of the lenses not cooperatively assigned thereto is cut out and/or the reflectors are substantially chosen not greater than the intersection figure of the beam generated from the assigned lenses necessitates. In the former case a reflector in one semi-infinite space which intersects a beam directed to the reflector within the other semi-infinite space is cut along the intersection curve so that it does not anymore cover a part of the beam and the beam can pass unobstructed.

On the other hand it is also possible to chose the area of the reflectors only as large as is necessitated by the assigned beam, that is those beams, which will be reflected by the reflector considered.

By providing a third focusing lens the optical major axis of which laying at least nearly in the normal, one reaches that beside the two spacial directions monitored by the reflectors provided, also a third spacial direction according to direction of the central axis is monitored, whereby the beam generated by this third lens is directed without reflection on the area passing between the two reflectors.

The reflectors are provided on a carrier which defines the normal and may be made together with the carrier out of one piece, the carrier providing for accurate geometrical positioning of the reflectors. Further thereto, the carrier comprises in its central area means for introduction of a sensor- or an emitter-element as of an optoelectric transducer, so that an accurate geometrical relation is reached between transducer, receiving characteristic and reflectors. By providing an at least nearly arc formed lens carrier three lenses being arranged along its periphery, whereby the major axis of the two lateral lenses are displaced in direction of an arc axis, preferably symmetrically with respect to the major optical axis of the third lens, and preferably directed in radial direction and by preferably providing the lens carrier with a positioning and fixating means for the reflector carrier, a simple way is found to reach very accurate geometrical relations between the lenses, the reflectors and the transducer.

If it is an object to use the inventive arrangement not anymore to monitor specific spacial directions but to monitor as continously as possible, at least the entire semi-infinite space above the second plane, then in each of the semi-infinite spaces separated by the first plane eventually at least two focusing lenses are provided and in each of the semi-infinite spaces, preferably on the same side of the second plane, a reflector element being so formed that their intersection curve—when intersected by a further plane which incorporates the normal—are concavely bent or fractured towards the normal to form specifically assigned reflecting areas for specific directions of received rays if all rays are on one hand received as narrow beams or, when on the other hand received diffusely, and thus focusing lenses are to be provided, for specific beams of said lenses. Considering the fact that the reflected rays should hurt the area as fare as possible in a point that is the foot of the normal, each of the reflecting areas define a plane the intersection line of which with the second plane and the normal projection of the optical major axis of that lens assigned to that reflecting area on the second plane are warped with respect to each other. The same is valid if already beamed rays are received and thus there is no need for further focusing by means of the lenses. Then instead of the geometrical relation between optical major axis and reflector areas the same conditions have to be fullfilled for the beams received and the reflector areas.

A relatively simple and accurate arrangement of reflecting areas and focusing beams' major axes or narrow beams received is realized by providing at least two preferably plane reflecting areas at each reflector element which areas being fractured with respect to each other. For the object of reflecting the rays received under wide angle with respect to the normal in such a manner that they arrive at its foot area under relatively small angles in each of semi-infinite spaces, those of the optical major axes which enclose with respect to the normal greater angles are directed on those of said reflecting areas whose own normal enclose smaller angles with respect to said normal. To directly exploit the high receiving sensitivity of a transducer or detector around its central lobe axis at least one further focusing lens is provided, the optical major axis of which now being directly directed on the area around the foot of the normal i.e. without reflection. Preferably several such additional focusing lenses are provided whose beams are directed without single reflection towards the foot of the normal. The inventive optical arrangement is perfectly suited to be used together with passive infrared detectors as the pyroelectric detector mentioned above. The arrangement may thus comprise an optoelectric transducer with its receiving area in said area of the second plane whereby the electrical output signal of the transducer is connected to a control unit for lights of a room. Additional features and, advantages of the inventive method and arrangements will become clear from the following figures which show the invention by way of examples.

There is shown in

FIG. 1a Schematically the general inventive arrangement of reflectors to perform the inventive method.

Figure 1B:
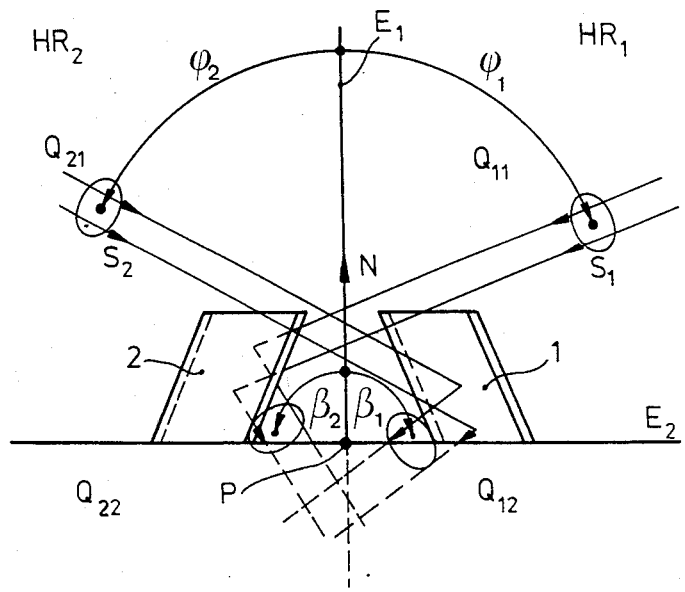

FIG. 1b A side view of the arrangement according to FIG. 1a.

Figure 2A:
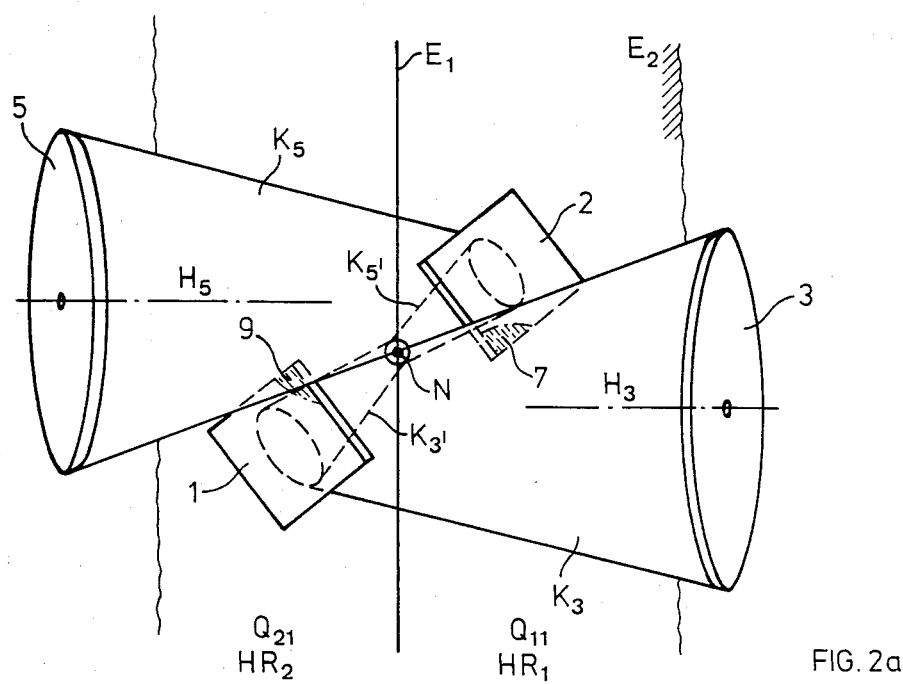

FIG. 2a A further embodiment of the arrangement according to FIG. 1a with focusing lenses cooperatively assigned to the reflectors for monitoring rays which are diffusely received.

Figure 2B:
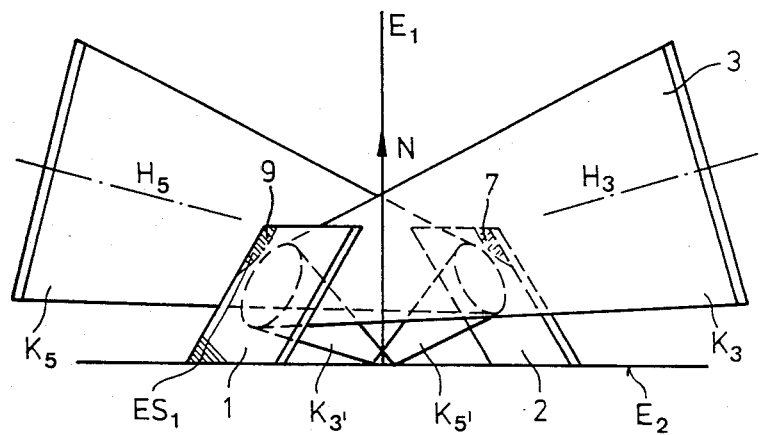

FIG. 2b A side view of the arrangement according to FIG. 2a.

Figure 3A:
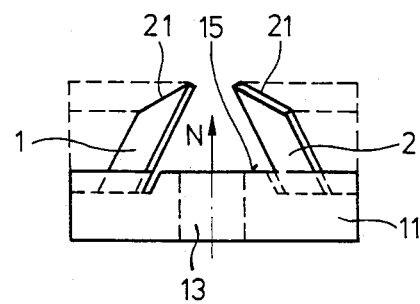

FIG. 3a A reflector carrier with inventively arranged reflectors to deflect rays substantially received from two spacial directions.

Figure 3B:
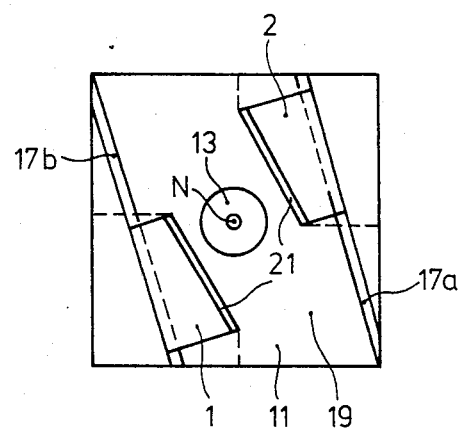

FIG. 3b Another view of the arrangement according to FIG. 3a.

Figure 4A:
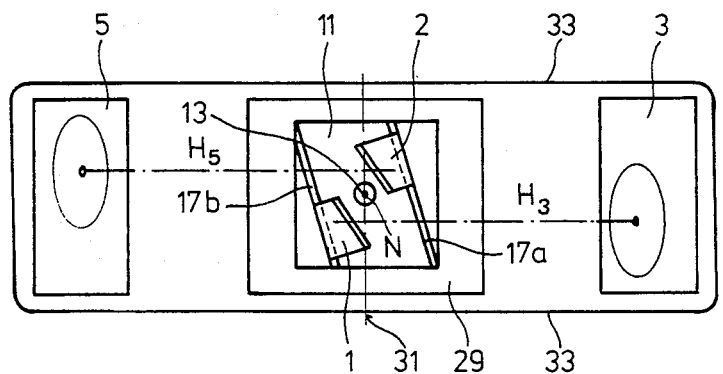

FIG. 4a A preferred arrangement with lenses- and reflector carrier to perform the inventive ray deflection and to monitor rays received substantially from three spacial directions.

Figure 4B:
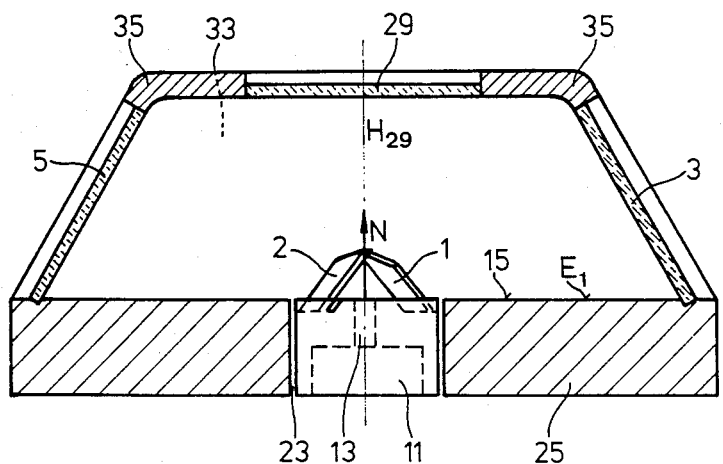

FIG. 4b A partial section view of the arrangement according to FIG. 4a.

Figure 5A:
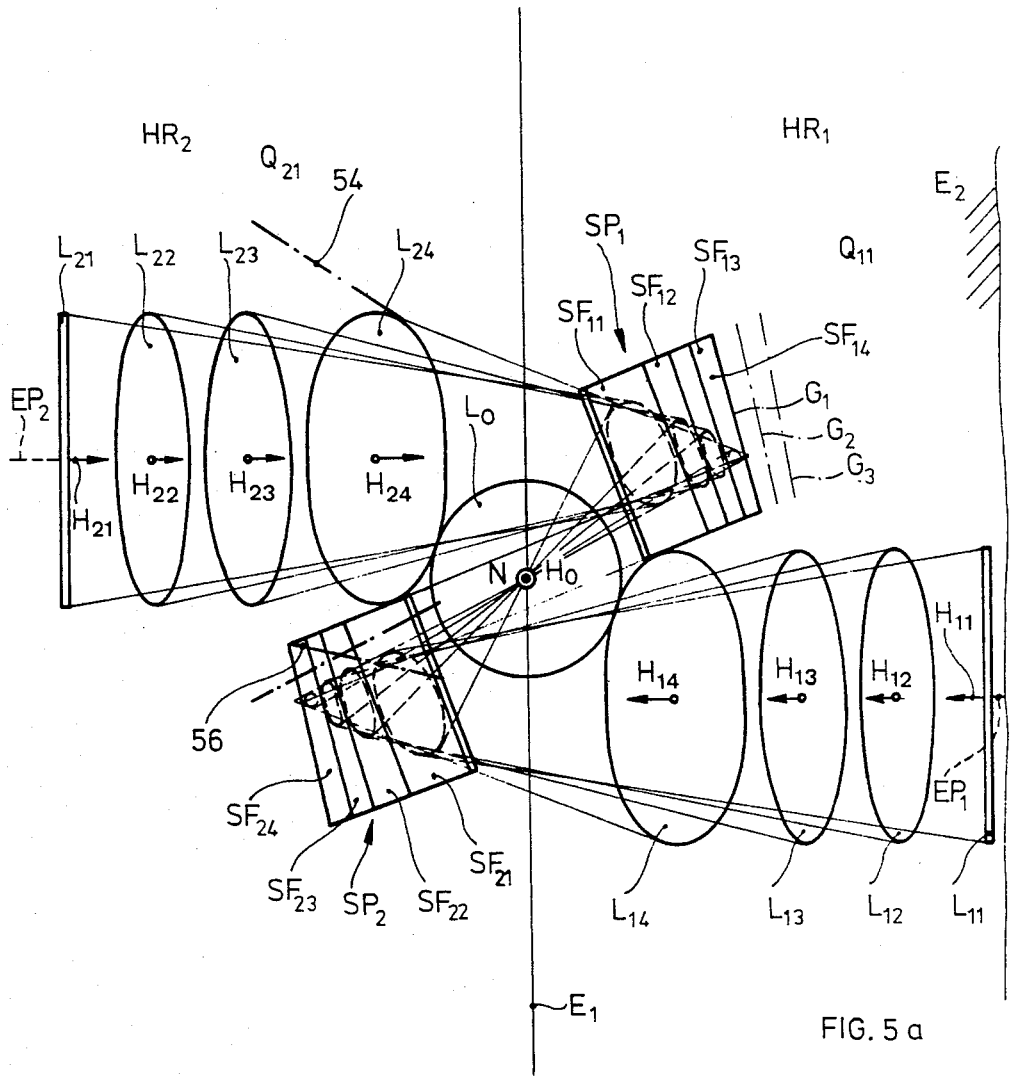
Figure 5:
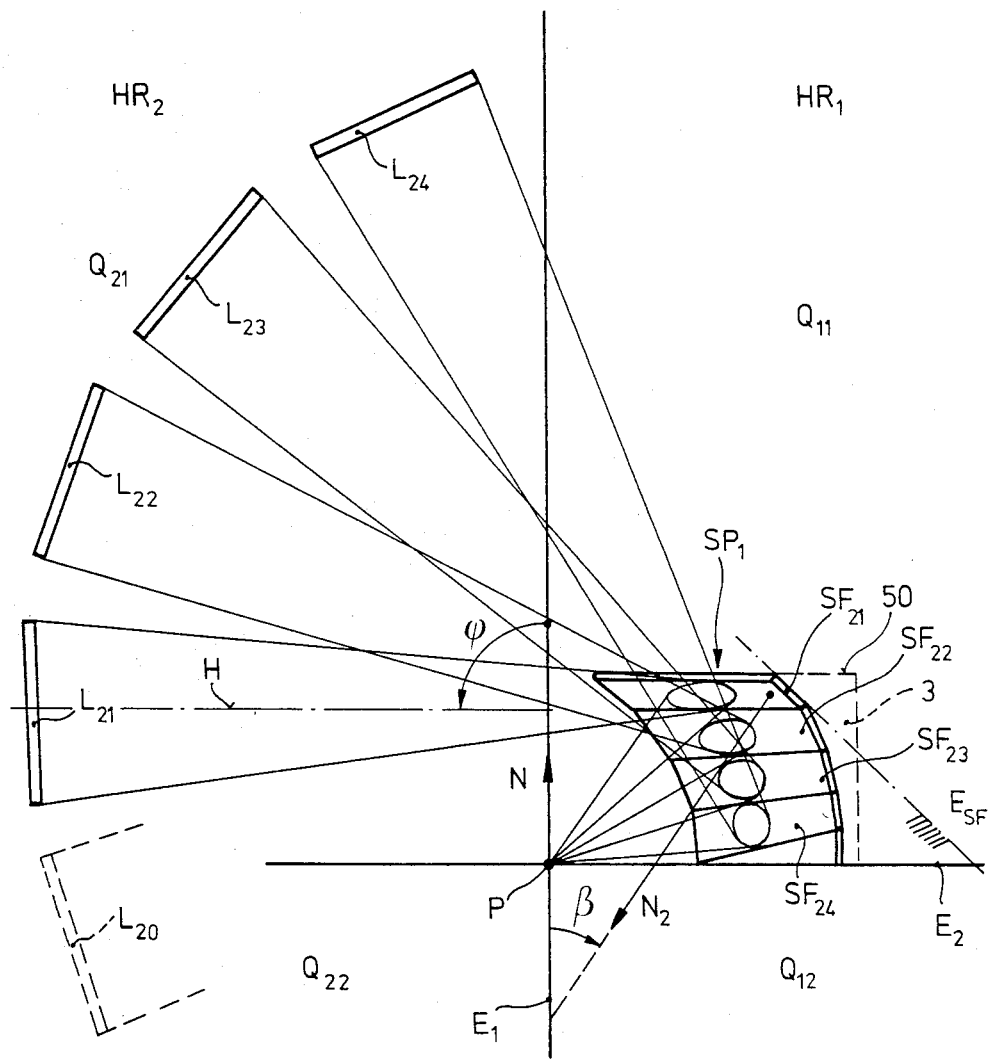

FIG. 5a Another embodiment of the inventive arrangement for the deflection of rays received not specifically from specific spacial directions.

FIG. 5b A partial side view of the arrangement according to FIG. 5a.

Figure 6A:
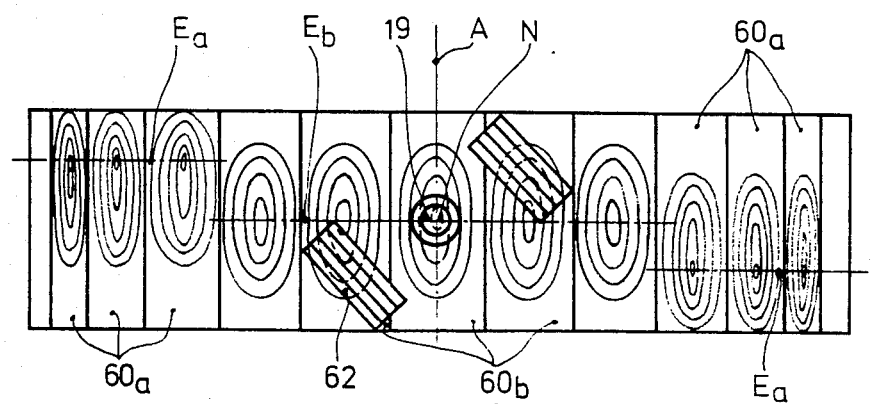

FIG. 6a A view of another preferred inventive optical arrangement.

Figure 6B:
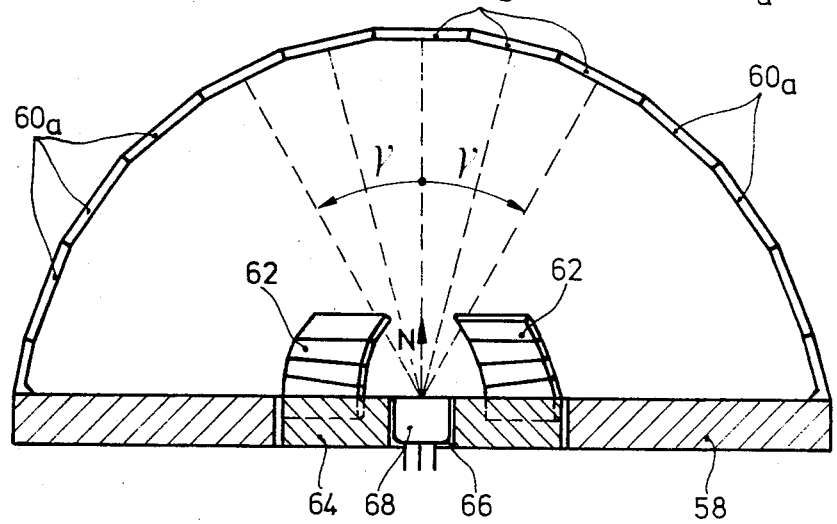

FIG. 6b A side view of the arrangement according to FIG. 6a.

Figure 7:
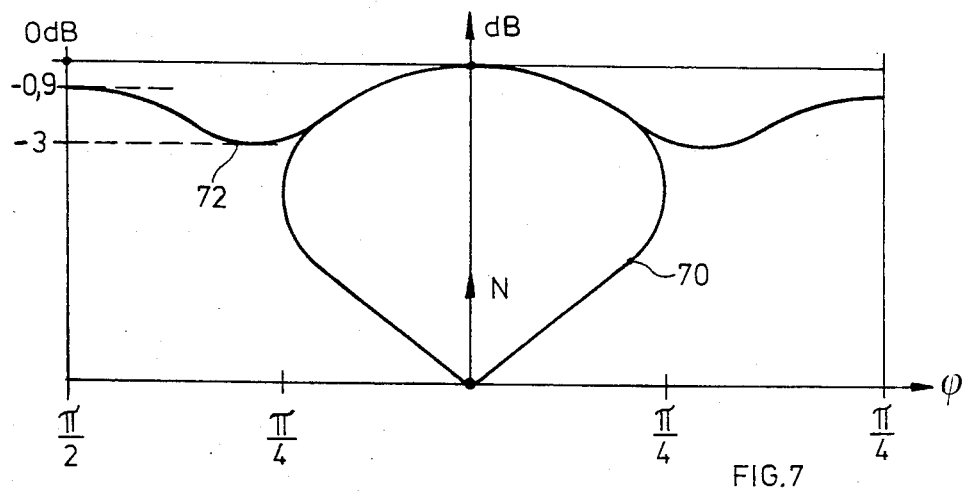

FIG. 7 The receiving lobe of a infrared detector as an ELTEC pyroelectric detector together with the results which are reached combining such a detector with a wide angle focusing optical arrangement according to the invention and e.g. as shown in the FIG. 6.

Figure 8:
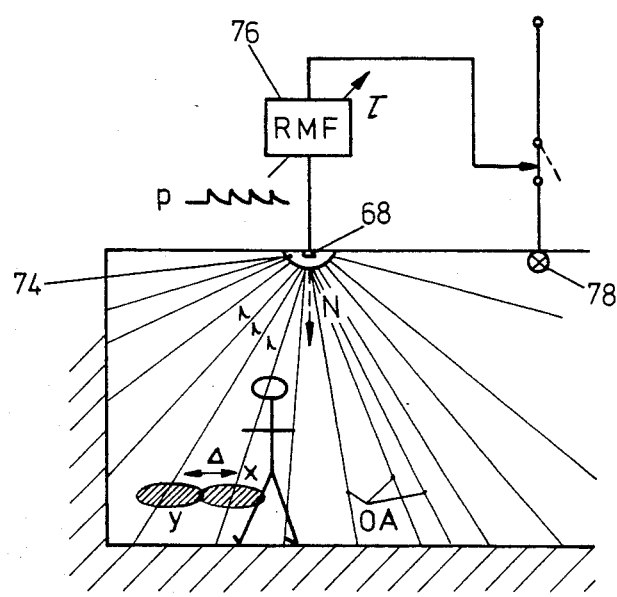

FIG. 8 The application of an inventive optical arrangement in a room to control the lights of that room into on state as long as a person as infrared source remains within that room.

According to FIG. 1a, 1b a first plane $E_1$ divides the complete space in two semi-infinite spaces $HR_1$ and $HR_2$. A second plane $E_2$ subdivides the semi-infinite bodies $HR_1$ and $HR_2$ in respective quadrants $Q_{11}$ to $Q_{22}$. Within the first plane $E_1$ a normal N with respect to the plane $E_2$ is defined. Rays $S_1$ and $S_2$ respectively originating from the semi-infinite bodies $HR_1$ and $HR_2$, which especially according to FIG. 1b comes in with relatively large angles $\phi_1$, $\phi_2$ respectively with respect to the normal N, shall be deflected in such a manner that, after deflection, they are directed on an area S of the second plane $E_2$ with smaller angles $\beta_1$, $\beta_2$ respectively with respect to said normal N. To achieve this target the rays $S_1$ originating from the one semi-infinite space $HR_1$ or the rays $S_2$ originating from the other semi-infinite space $HR_2$ are deflected by means of single reflection at reflectorelements 1, 2 respectively and are reflected towards the second plane $E_2$ onto the area F of the plane $E_2$ around the foot P of the normal N.

The reflectorelement 2 provided for the reflection of the rays $S_1$ originating from the semi-infinite space $HR_1$ is at least in parts positioned within the semi-infinite space $HR_2$, the reflectorelement 1 for the reflection of the rays $S_2$ originating from the semi-infinite space $HR_2$ is at least partly positioned within the semi-infinite body $HR_1$. In an already more specific embodiment the reflectorelements 1 and 2 are positioned within a positioning plane which preferably is the second plane $E_2$ as shown. As may be seen from FIG. 1a in dotted lines, the reflectorelements 1 and 2 may extend at least in parts into the respective other semi-infinite spaces so, reflector 1 into semi-infinite space $HR_2$ and reflector 2 into semi-infinite space $HR_1$. The reflectorelements are so positioned that the normal N with the area F around its foot P, towards which the rays are to be reflected, comes to lay between said elements, which latter being preferably positioned in axial symmetry with respect to the normal N. Although such a symmetric mounting of the reflectorelements 1 and 2 is preferred in most cases, it is evident that other mountings than this symmetric one are possible as long as a reflection of the incident rays on the area F around foot P is achieved. Positioning of the reflectorelements 1 and 2 on the plane $E_2$, its inclination with respect to the normal N are chosen according to the direction of incidence of a rays $S_1$, $S_2$ to be treated, position and width of the area F and according to known optical laws.

Inspite of the fact that according to FIGS. 1a and 1b the reflector elements 1 and 2 are plain mirrors it is possible as shown at 1a with dotted lines to use concave reflector elements. According to the FIGS. 2a and 2b a collective lens 3 in quadrant $Q_{11}$ is cooperating with reflector element 1 and a collective lens 5 in quadrant $Q_{21}$ is cooperating with reflector element 2. The optical axes $H_3$ of the lens 3 and $H_5$ of the lens 5 are warped with respect to the normal N and can stand thereto also at right angles, and provide parallel projection lines on the plane $E_2$ which latter being preferably symmetric with respect to the normal N or its foot P. The conic beam $K_3$ of the lens 3 is reflected at the reflector element 1 to form the reflected beam $K_3$, directed towards the foot P of the normal N on plane $E_2$, and analogically the beam $K_5$ of lens 5 is reflected on reflector element 2 become the reflected beam $K_5$. As may be seen from these figures, it is possible that, at certain opening angles of the beams, the respective reflector elements 2 or 1 are not cooperating with these respective cones $K_3$ or $K_5$, intersect with these beams and thus cover a part of the beams from being directed to the cooperating reflector elements 1 or 2. This may be e.g. the case for the beam $K_3$ intersected in an area 7 by element 2 and for the beam $K_5$ intersected in an area 9 by reflector element 1. To prevent this the reflector elements 1 and/or 2 respectively are formed at least nearly to follow the intersection line which is formed by its plane and the according beam. As may be seen from FIG. 2b thus the reflector element 1 is cut along the line $ES_1$ which is this intersection line, thus leaving the area 9 unobstructed for passage of the beam $K_5$. This forming-technique of the respective reflector elements may especially be realised as long as no harm does occur to the reflection of cooperatively assigned beams as $K_3$ and $K_3$, cooperatively assigned to reflector element 1. Additionally or inspite of this forming of the reflector elements each reflector may be dimensioned only as large as required to cover the complete figure which is drawn on it by the cooperatively assigned beam, for reflector element 2 the figure drawn from the beams $K_5$ or $K_5$, for reflector element 1 the figure drawn from the beams $K_3$ or $K_{3'}$.

In FIG. 3 a first embodiment of the optical arrangement is shown, comprising a carrier body 11. The carrier body 11 has a central opening 13 for the introduction of a detector- or an emitter element as for an optoelectrical converter element. An upper side 15 of the carrier 11 defines the plane $E_2$ according to the FIG. 1 and 2. Inclined positioning and fixating grooves 17a, 17b are provided within upper side 15, which enable proper positioning of the reflector elements 1 and 2, with a defined inclination with respect to the normal N.

The carrier body 11 which carries within its grooves 17a, 17b the reflector elements 1 and 2 is preferably made of a plastic material. As shown in dotted lines it is also possible to make the reflector elements 1 and 2 and the body 11 of one piece whereby then the reflecting planes are formed by appropriate cutting of a central part 19 into a material block provided with the opening 13 for the detector- or the emitter element. If this entire body or different portions thereof are provided with a reflecting metal layer, this reflecting layer is preferably additionally used as an electrical screen for the detector- or emitter element.

As may be seen from the FIG. 3a and 3b here too the upper edges 21 of the reflector elements 1 or 2 are inclined towards each other not to obstruct the respective, non assigned beams, as was explained with the help of FIG. 2b.

As shown in the FIGS. 4a and 4b the carrier body 11 is introduced into a positioning and fixating opening 23 of a support body 25 of a lens holder 27. Beside the two lateral lenses 3 and 5 there is provided a central third lens 29. Its optical axes $H_{29}$ lays at least approximately within the normal N of the upper side 15 of body 11.

As the two reflector elements 1 and 2 enclose a central space which is open in direction of the normal N it is possible to monitor rays from a third direction with this third converging lens 29. The lenses 5, 29 and 3 are preferably of square form. As may be seen from FIG. 4a, the optical axes $H_5$ and $H_3$ of the lenses 5 and 3 are symmetrically displaced with respect to the normal N. In the plane of FIG. 4b the three lenses defines an arc with an axes 31 according to FIG. 4a. The lenses are fixed on both sides on upstanding walls 33 and on connecting crossbars 35.

The lens holder 27 as well as the carrier body 11 are preferably made of a plastic material as well as the lenses 5, 29 and 3. With the deflecting method disclosed up to here and the according optical arrangement a very compact device with simple structure is realized which enables to monitor rays incoming from especially three space directions laying at least nearly within a plane, whereby two of these directions may define have an angle of up to 180° with respect to each other, eventually even of more. This is realized by the feature that rays which come in under great angles with respect to a plane's normal are reflected on an area of that plane at which a sensor- or an emitter-element is provided with such small angles with respect to that normal that the receiver or emitter characteristic of the element provided is only exploited around its axes of maximum sensibility.

In FIG. 5a a further inventive embodiment is shown following the principals of FIG. 1. Again the first plane $E_1$ defines the semi-infinite spaces $HR_1$ and $HR_2$. The second plane $E_2$ in rectangular relation with respect to plane $E_1$ subdivides them, in quadrants $Q_{11}$, $Q_{12}$ and $Q_{21}$, $Q_{22}$ respectively. The normal N of the second plane $E_2$ normal N. The planes defined by these areas intersect the plane $E_2$ in straight lines $G_1$, $G_2$, $G_3$ which are warped with respect to each other as is shown.

As shown in FIG. 5b by dotted lines, the reflector elements could also formed by reflecting areas of, accordingly formed into a body 50. The rays which come in at a greater angle $\phi$ with respect to the normal N as shown up to about 90° or even more and are focused for instance by the lens $L_{21}$ reach the reflector area $SF_{21}$ of the reflector element $SP_1$ whereby this reflector area assigned to that lens has a normal $N_2$ according to FIG. 5b, which defines with respect to the normal N a smaller angle $\beta$ compared with the normals $N_2$ (not shown) of the other reflector areas $SF_{22}$, $SF_{23}$, $SF_{24}$. Thus the lenses for rays which come in under greater angle with respect to the normal N are assigned to reflector areas whose own normal $N_2$ has a smaller angle with respect to said normal N. The same is valid for the rays coming in from either semi-infinite spaces $HR_1$ or $HR_2$ and their assigned lenses L and reflector areas. It is even possible as shown in FIG. 5b by dotted lines to have rays which come in with an angle greater than 90° with respect to the normal N first focused by an accordingly arranged further lens $L_{20}$ and then having the focused beam of that lens $L_{20}$ reflected by means of an accordingly arranged and formed reflector area (not shown) thus reflecting these rays towards the area F with a small angle with respect to that normal N too. With respect to the projection planes $EP_1$, $EP_2$ of the assigned lens' optical axes $H_{21}$ to $H_{24}$ the reflector element $SP_1$ is inclined to such an amount that the intersection line of the planes $E_{SF}$ (FIG. 5b) defined by the reflector areas cross the intersection line of lays again within plane $E_1$. In each of the semi-infinite spaces $HR_1$, $HR_2$ respectively and especially in the quadrants $Q_{21}$, $Q_{11}$ on the one side of the second plane $E_2$ converging lenses L are provided so for instance in the semi-infinite space $HR_1$ the lenses $L_{11}$ to $L_{14}$ and in the semi-infinite space $HR_2$ for instance for lenses as well namely the lenses $L_{21}$ to $L_{24}$. The optical major axes $H_{11}$ to $H_{14}$ of the lenses $L_{11}$ to $L_{14}$ in the semi-infinite space $HR_1$ are positioned in a projecting plane $EP_1$ rectangular to the plane $E_2$ and the axes $H_{21}$ to $H_{24}$ in a plane $EP_2$ whereby the projecting planes $EP_1$, $EP_2$ are, also rectangular with respect to the first plane $E_1$. It must be pointed out that other arrangements of the lenses $L_{11}$ to $L_{14}$ or $L_{21}$ to $L_{24}$ are possible and also different numbers of lenses may be provided in each semi-infinite space $HR_1$, $HR_2$.

In analogy to FIG. 1a and 1b there is provided for the single reflection towards the second plane $E_2$, of the rays which are focused by the lenses $L_{21}$ to $L_{24}$ in the semi-infinite space $HR_2$ a first reflector element $SP_1$ in space $HR_1$ and analogically a second reflector element $SP_2$ within the semi-infinite space $HR_2$ for single reflection of the rays coming in from the first semi-infinite space $HR_1$ and there being focused by the lenses $L_{11}$ to $L_{14}$. Each of the reflector elements $SP_1$, $SP_2$ is concavely bent or flexured along discrete lines towards the normal N so that each reflector element $SP_1$, $SP_2$ provides for plain reflecting areas $SF_{11}$ to $SF_{14}$ and respectively $SF_{21}$ to $SF_{24}$ accordingly assigned to the lenses $L_{21}$ to $L_{24}$ and $L_{11}$ to $L_{14}$. The reflecting areas SF are, as mentioned, preferably formed by plain surfaces which are flexured towards each other and towards the this projection plane $EP_2$ with the second plane $E_2$ in warped relation. Thus a concentration of the ray beams reflected at according the reflector elements $SP_1$, $SP_2$ is reached on a point-symmetrical area around the foot P of the normal N on the second plane $E_2$.

As shown in FIG. 5a at least one further collective lens L0 is provided. The optical major axis $H_o$ of it falls at least nearly into the normal N. Preferably several such additional lenses are provided so that their optical axis on their according beams fall unreflected directly on the second plane $E_2$ within the area F around of the foot P of the normal N. As shown, the reflector element $SP_2$ does not harm the passage of rays coming in from the semi-infinite space $HR_2$ where it is mounted and neither does the reflector element $SP_1$ harm the rays coming in from the semi-infinite space $HR_1$. In certain cases it may occur as was already described with the aid of the FIGS. 2a and 2b, for instance when tightest possible arrangement is needed or when different lenses are chosen, that the paths of rays from the semi-infinite space $HR_2$ are intersected by the reflector element $SP_2$ and accordingly that the paths of rays from the semi-infinite space $HR_1$ are intersected by the reflector element $SP_1$. This is shown as an example in FIG. 5a by the dotted beam of rays 54. If this occurs, the according paths of rays are obstructed by the according, not assigned reflector elements as shown by the reflector element $SP_2$ at 56. Then the according reflector elements are formed at least approximately following their intersection figures with these paths of rays that is the reflector elements are cut according to the figure of the rays coming in from the semispherical spaces where the according reflector elements are arranged in.

In FIG. 6a and 6b a further embodiment of the inventive arrangement being in fact a wide angle optical arrangement is shown. A plurality of lenses 60a and 60b is arc-like mounted on a lens support 58. Preferably these lenses are again square-shaped plastic lenses. The optical main axis of the lenses 60a, the beams of which being reflected on the reflector elements 62 are, as shown in FIG. 6a on both sides, displaced with respect to an axis A of the arc into planes $E_a$. The major axis of the lenses 60b on the other hand the beams of which being unreflected directed towards the plane $E_2$, lay within a plane $E_b$, symmetrically arranged between the two planes $E_a$. In the plane $E_b$ and in the central area of the lens support 58 a sensor/reflector carrier 64 is insertable into the support 58, said sensor/reflector carrier 64 being provided with a central opening 66 for the sensor 68 as for instance a passive infrared sensor as a Mod. 408 pyroelectric detector of ELTEC INSTR. INC., USA. The reflector elements 62 are mounted on the sensor/reflector carrier 64, the reflecting areas thereof being concavely bent or fractured towards the normal N. As especially the exact geometrical position of the reflector elements 62 with respect to the normal N or the central area of sensor 68 to be provided, eventually of an emitting devise is of predominant importance, it is preferred, as shown, to provide the sensor 68 and the reflectors 62 on the same carrier 64. The lens support 58 is preferably made from a plastic material, as eventually the reflectors 62 and the sensor/reflector carrier 64, which latter may be made of one piece of a plastic material.

FIG. 7 shows the reception characteristic 70 of a passive infrared optoelectric device. As may be seen the sensitivity of the sensor is maximal with respect to incoming rays in the direction according to its central axis N, with other words, having zero angle with respect to that axis. This maximum sensitivity may for instance be defined as OdB. With raising angle $\phi$ of incoming rays with respect to the central axis N and especially when these angles $\phi$ become greater than 45° the sensitivity of the sensor considerably decreases. The curve 72 shows the sensitivity which is realized with a sensor showing the receiving characteristic according to lope 70 but with provision of the inventive wide angle focusing optic as was described. Across the entire band of angle of $\phi$ smaller or equal 90° minimal sensitivities with respect to the maximum sensitivity of the sensor according to OdB are reached which depart only by about $-3$ db from that maximum at angles of about $\phi \cong 45°$. At the borders of that angle band, at about $\phi \cong 90°$ a damping of only about $-1$ dB is reached. This clearly shows that with the inventive method and the inventive arrangement extreme good results are realized which enable to monitor entire rooms with the provision of single sensors which latter shows a relatively narrow angled sensitivity lope. Thus for instance the lights of a room may be controlled by such an arrangement whereby lightening is kept on as long as somebody stays within that room. Further it must be pointed out that normally such sensor arrangements do not respond on static values of infrared intensity but are triggered by transient of intensity as encountered when a person, as a source of infrared radiation, crosses optical axis through the room which are monitored by such sensors. It was found as shown in FIG. 8 that the clearly defined assignment of lenses and reflector areas of the arrangement 74, realized as was described, brings the advantage that such a dynamic detection is still possible in that already small movements of $\Delta$ such a radiation source causes leaving a space area X assigned to one lens and entering into a space area Y monitored by the neighbour lens. This generates electrical output pulses p at the output of the opto-electrical device as of a passive infrared sensor 68. These train of impulses is them evaluated e.g. by a retriggerable monoflop-unit 76 as information whether a person is still in the area monitored by the inventive arrangement or not. If the impulse train p shows no impulses for a presettable time span $\tau$, than the light 78 of the room is switched off. With other words a relatively tight pattern of optical axis OA are monitored by such an arrangement through the room with angles up to 90° with respect to the central axis N of the arrangement and a person staying within the room will by its normal movements $\Delta$ always generate sensor output impulses p by entering into or leaving the monitored optical axis OA.

I claim:

1. In an optical arrangement for the detection of optical rays received from a wide spatial angle which rays are caused to impinge upon the surface of a detector having an optical detection capability which undesirably decreases in sensitivity as the angle of optical rays impinging upon said detector surface increases, the improvement therewith of apparatus for confining said rays within a predetermined area indicative of a high sensitivity for said detector, said apparatus comprising:

(a) carrier means defining a generally planar surface;

(b) at least two separate, spaced-apart reflectors projecting from said generally planar surface of said carrier means on opposite sides of a line perpendicular to said generally planar surface, each of said reflectors having a reflecting surface, said reflecting surfaces being tilted towards said perpendicular line so that said reflecting surfaces face towards said perpendicular line and face towards said generally planar surface, said reflectors defining openings therebetween at the margins of said reflectors extending to said generally planar surface so that radiant energy rays directed adjacent said generally planar surface can pass into said openings alongside one of said reflectors so as to impinge on the reflecting surface of the other one of said reflectors; and (c) means for mounting said detector so that said detector surface is disposed at said generally planar surface of said carrier means in a predetermined area adjacent the intersection of said perpendicular line with said generally planar surface and so that said detector surface faces towards said reflectors, whereby optical rays passing adjacent said generally planar surface will impinge upon said reflecting surfaces and will be reflected onto said detector surface to enable said detector to respond to said rays with a substantial increase in efficiency.

2. An optical arrangement according to claim 1, wherein said reflectors are planar.

3. An optical arrangement according to claim 2, wherein the planes of said reflectors intersect said generally planar surface of carrier means in at least nearly parallel straight lines.

4. An optical arrangement according to claim 1, further comprising first and second focusing lenses, one of said focusing lenses being associated with each of said reflectors, the optical major axis of each of said focusing lenses intersecting the reflecting surface of the associated reflector.

5. An optical arrangement according to claim 4, wherein the optical major axes of said lenses is in rectangular or warped relation with respect to said perpendicular line, with said perpendicular line lying between said optical major axes.

6. An optical arrangement according to claim 4, wherein the projections of said optical major axes of said lenses and the lines of intersection of said planes of said reflectors with said generally planar surface of said carrier means define an area which is symmetrical about the point of intersection between said perpendicular line and said generally planar surface.

7. An optical arrangement according to claim 4, wherein an area of said reflector elements projecting into the beam of said lenses not cooperatively assigned is cut out and/or that the area of the reflectors is chosen substantially not greater than the intersection figure of the beam generated from the assigned lens.

8. An optical arrangement according to claim 4, further comprising a third focusing lens, the optical major axis of which lies at least nearly on said perpendicular line.

9. An optical arrangement according to claim 8, wherein said reflectors and said carrier means are formed of one piece.

10. An optical arrangement according to claim 8, including an at least nearly arc-formed lens carrier carrying at its periphery said three lenses, the optical major axes of said first and second focusing lenses being displaced in the direction of the axis of said arc and arranged symmetrically with respect to the optical major axis of said third lens, the optical major axes of first and second focusing lenses being disposed in approximately radial directions with respect to said arc.

11. An optical arrangement according to claim 1 wherein the reflecting surface of each of said reflectors includes a plurality of reflector surface areas, said reflector surface areas being so formed that the intersection line of said reflector surface areas of each of said reflectors with a further plane which incorporates said perpendicular line is a curve concave with respect to said perpendicular line.

12. An optical arrangement according to claim 11 further comprising a plurality of focusing lenses, each of said focusing lenses being associated with one of said reflector surface areas.

13. An optical arrangement according to claim 12, wherein each of said reflector surface areas defines a plane, the intersection line of each of the planes defined by said reflector surface areas with said generally planar surface of said carrier means being oblique to the normal projection on said generally planar surface of the optical major axis of the assocaited focusing lens.

14. An optical arrangement according to claim 13, wherein the normal projections of said optical major axes of said focusing lenses on said generally planar surface of said carrier means are parallel to each other.

15. An optical arrangement according to claim 12, wherein the normal projections of said optical major axes of said focusing lenses on said generally planar surface of said carrier means are parallel to each other.

16. An optical arrangement according to claim 15, wherein said reflector surface areas define planes which intersect said generally planar surface of said carrier means in intersection lines which are oblique with respect to each other.

17. An optical arrangement according to claim 11, wherein the reflectors are mounted on said carrier means.

18. An optical arrangement according to claim 17, wherein said carrier means and said reflectors are made of one piece.

19. An optical arrangement according to claim 12, wherein each of said reflector surface areas is substantially not larger than its intersection with the beam of the associated focusing lens.

20. An optical arrangment according to claim 12, including at least one further focusing lens, the optical major axis of which is directly directed on said predetermined area adjacent said point of intersection of said generally planar surface and said perpendicualr line.

21. An optical arrangement according to claim 1, wherein said means for mounting said detector is operative to maintain said detector substantially centered with respect to said perpendicular line.

22. An optical arrangement according to claim 12, wherein said lenses are made of a plastic material and being arranged in arced configuration.

23. The optical arrangement according to claim 1, further comprising an infrared detector mounted to said carrier by said mounting means.

24. The optical arrangement according to claim 12, wherein the direction of said optical major axis of said lenses and the position of said reflecting surface areas on said reflectors is so chosen that those of said optical major axes which enclose a larger angle with respect to said perpendicular line are directed on reflector surface areas, the normal of which enclose with respect to said perpendicular line of said carrier means, a smaller angle.

25. A method for the detection of optical rays received from a wide spatial angle using a detector having a detector surface and having undesirably diminished sensitivity to rays impinging on said detector surface at large angles to a line perpendicular to said detector surface, the method comprising the steps of:
  (a) maintaining two opposed reflectors, each having a reflecting surface, adjacent said detector on opposite sides of said line perpendicular to said detector surface so that said reflectors define openings therebetween at the margins of said reflectors, and so that said reflecting surfaces are tilted towards said perpendicular line, the reflecting surfaces facing towards said perpendicular line and towards said detector surface; and
  (b) reflecting received rays initially directed at a wide angle to said perpendicular line onto said detector surface by way of said reflecting surfaces so that rays directed at a wide angle to said perpendicular line pass alongside one of said reflectors into one of said openings, impinge upon the reflecting surface of the other one of said reflectors and are directed from the reflecting surface onto said detector surface.

26. The method according to claim 25, wherein each ray directed at a wide angle is reflected only a single time.

27. The method according to claim 26, wherein said rays directed at wide angles are focused before said single reflection is performed.

28. The method according to claim 25, wherein rays received initially directed at smaller angles to said perpendicular line, are focused and directed on said detector surface without said reflection.

29. The method according to claim 25, wherein the course of rays is inverted in ray-emitting operation.

* * * * *